United States Patent [19]

Meltsch

[11] 4,442,153
[45] Apr. 10, 1984

[54] LONGITUDINALLY DIVIDED CABLE SLEEVE OF THERMO-PLASTIC SYNTHETIC MATERIAL WITH A SHAPE MEMORY

[75] Inventor: Hans-Jürgen Meltsch, Germering, Fed. Rep. of Germany

[73] Assignee: Siemens Aktiengesellschaft, Berlin & Munich, Fed. Rep. of Germany

[21] Appl. No.: 313,342

[22] Filed: Oct. 20, 1981

[30] Foreign Application Priority Data

Dec. 19, 1980 [DE] Fed. Rep. of Germany ....... 3048051

[51] Int. Cl.³ .................... F16L 11/12; B65D 65/42; H02G 15/18; B32B 3/02
[52] U.S. Cl. ........................... 428/99; 138/156; 138/166; 138/167; 138/168; 428/36; 428/192; 428/126; 428/127; 428/128; 428/129; 174/DIG. 8; 174/92
[58] Field of Search ............... 138/156, 166, 167, 168; 174/92, DIG. 8; 428/99

[56] References Cited

U.S. PATENT DOCUMENTS

| 3,379,218 | 4/1968 | Conde | 174/DIG. 8 |
|---|---|---|---|
| 3,455,336 | 7/1969 | Ellis | 174/DIG. 8 |
| 3,542,077 | 11/1970 | Muchmore | 174/DIG. 8 |
| 3,654,049 | 4/1972 | Ausnit | 428/99 |
| 4,268,559 | 5/1981 | Smuckler | 428/99 |
| 4,378,393 | 3/1983 | Smuckler | 428/99 |
| 4,388,488 | 6/1983 | Ulcek et al. | 138/166 |
| 4,391,303 | 7/1983 | Holgersson | 138/168 |
| 4,399,840 | 8/1983 | Lee | 174/DIG. 8 |

FOREIGN PATENT DOCUMENTS

| 1947057 | 3/1970 | Fed. Rep. of Germany ... 174/DIG. 8 |
|---|---|---|
| 2334429 | 1/1975 | Fed. Rep. of Germany ........ 174/92 |
| 54-159722 | 12/1979 | Japan ............................. 174/DIG. 8 |
| 1503328 | 3/1978 | United Kingdom . |
| 1506242 | 4/1978 | United Kingdom ......... 174/DIG. 8 |
| 2054781 | 2/1981 | United Kingdom ......... 174/DIG. 8 |

Primary Examiner—William R. Dixon, Jr.
Attorney, Agent, or Firm—Hill, Van Santen, Steadman & Simpson

[57] ABSTRACT

A longitudinally divided cable sleeve having a strip-like sleeve member composed of thermo-plastic synthetic material having a memory shape characterized by the slot between the edges being covered by either the longitudinal edges being overlapped with respect to one another or one of the edges having an overlapping extension and with at least one of said edges having a mechanical reinforcement so that the edges are more thermally stable than the remainder of the strip when subjected to heat for shrinking the sleeve onto an object. The reinforcements may be completely embedded into the material of the strip, partially embedded or placed on outer surfaces thereof. Preferably, the reinforcements also support or provide interlocking connecting elements such as hook and catch elements for securing the edges together and the connection elements aid in taking up the shrinking force created during the shrinking operation.

23 Claims, 11 Drawing Figures

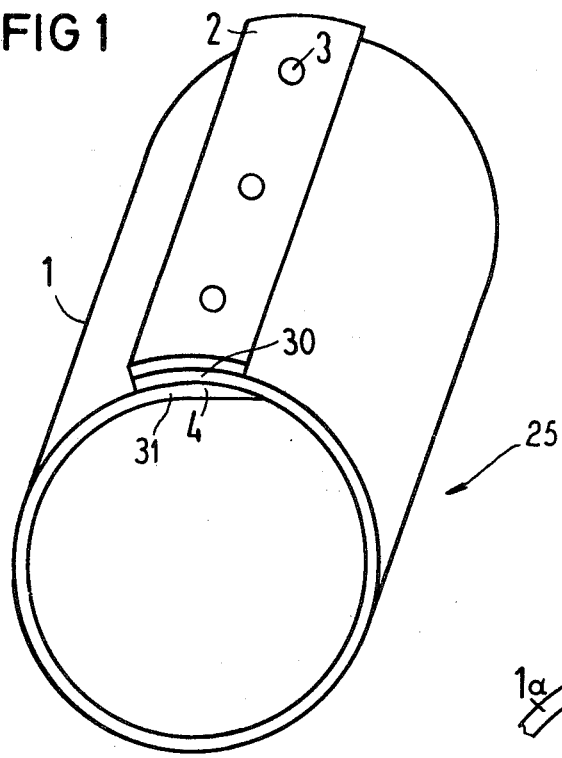
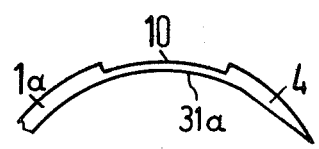
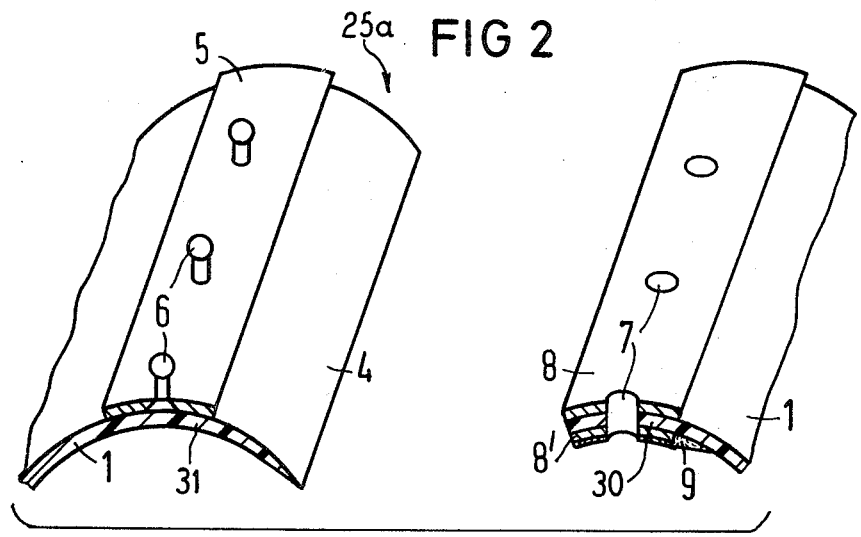

LONGITUDINALLY DIVIDED CABLE SLEEVE OF THERMO-PLASTIC SYNTHETIC MATERIAL WITH A SHAPE MEMORY

BACKGROUND OF THE INVENTION

The present invention is directed to a longitudinally divided cable sleeve, which is composed of a strip-like sleeve member of thermo-plastic synthetic material having a shape memory and has a sealing system for sealing the longitudinally extending edge portions together after the sleeve member has been applied to enclose an object. After the cable sleeve has received an object, it is heat shrinkable onto the object.

Longitudinally divided cable sleeves or sleeve casings, which have a sleeve member consisting of a thermo-plastic synthetic material provided with a shape memory and exhibit a longitudinal division or slot is disclosed in U.S. Pat. No. 3,455,336. Along each of the edges, the divided sleeve has a divided bead which is gripped by a C-shaped clip and is compressed in a sealed fashion. The sleeve member can have the shape of either a cylindrical tube or a branched tube depending on whether the sleeve is placed at a branched junction or over a straight line connection. The beads on each edge when held together by the C-shaped clamp have a T-shape cross-section and thus each of the beads has a part of a T-shape cross-section when separated from the adjacent bead.

During the shrinking process of this cable sleeve, one must pay attention to the fact that the closure region is not deformed to any possible extent so that along the cut or division, a gap will not occur to cause leakage. Also, a great danger, which occurs is that the shrinking forces during the shrinking process will become so large that the gap, particularly in the region with the cable, may be pulled apart. Further, there is a danger that during the heat shrinking process, due to an unintentional supply of heat on the closure system, the beads will soften and as a result of the shrinking forces will experience a deformation which will finally lead to leakage at the gripped edges.

SUMMARY OF THE INVENTION

The present invention is directed to providing a divided cable sleeve which has a sealing system for sealing the edges together which sealing system on the supplying of heat during the heat shrinking process of the cable sleeve will remain stable and will have the closure region adjacent the edges experience no deformation from the shrinkage forces.

The present invention accomplishes these goals by an improvement in a longitudinally divided cable sleeve having a strip-like sleeve member composed of a thermo-plastic synthetic material having a shape memory, said sleeve member having longitudinal edges and closure means for closing said edges together so that the edges are sealed together as the cable sleeve wraps around an object and the sleeve is shrinkable onto the object when heat is applied. The improvement comprises the closure means including means for overlapping a slot between the two edges and a mechanical reinforcement for the edges so that the edges are more thermally stable than the remainder of the strip member when subjected to heat for shrinking the sleeve onto an object. Preferably, each of the overlapping edges has a reinforcing element which is provided with coacting connecting elements which are coacting hook and latch elements which may be coacting hook elements or hook elements which are received in catch elements to form an interconnection between the two edges.

An advantage of the invention is that along each of the edges of the sleeve-like member forming the divided cable sleeve, the reinforcements or reinforcing elements are arranged and are thermally more stable than the material of the cable sleeve. This means that despite softening of the cable sleeve as a result of the application of heat, the cable sleeve at its edges and in the closure region is not deformed during the shrinking process. The reinforcements, which are supplied along the edges, support the material of the cable sleeve. The reinforcing elements also permit the sealing agent, which is for example a meltable adhesive, to be melted at the corresponding temperature and this sealing agent in connection with the sealing regions, which overlapp, can produce the required tightness of the seal.

An additional advantage of the embodiments in accordance with the present invention is that the longitudinal edges of the cable sleeve are arranged overlapping so that a pulling apart with the corresponding formation of a gap between the edges of the closure elements is not possible. Also the coacting hooks and catch or latch elements, which are applied in or respectively on the reinforcing elements, take up the shrinking forces acting in a circumferential direction. Since these reinforcements are arranged spatially along the entire edge region, a uniform force distribution will take place which will not lead to irregularities in the sealing region. The application of the reinforcement proceeds by means of correspondingly adhesion providing agent, for example, meltable hot sealing adhesive, polyethylene acryl co-polymers (PEAC), polyethylenes or polyamides with or without adhesion additives or agents. The reinforcements are for example designed as bands, bars or strips of metal which can be applied with the mentioned adhesive agent with sufficient mechanical stability directly onto the heat shrinking material of the cable sleeve. Also the elements forming the reinforcement may be mechanically secured on the sleeve by rivets or by being sewn with a tear resistant fiber or thread. The stability or strength of the mechical bond is considered sufficient when the bond between the reinforcing element and the shrinking material is preserved in the case of the required heating during the shrinking process and withstands the shrinking forces which arise during the time period of the shrinking process. The holding together of the overlapping closure regions proceeds by means of the corresponding linkage or hooking together of the hook and latch or catch elements which mutually engage one another. The transfer of the force thereby proceeds in each case onto the reinforcements and not directly onto the shrinking material of the cable sleeve. In this manner a non-uniform deformation of the sealing region, which results in the soft state and which can lead to the formation of leakages, are prevented.

The actual sealing of the closure region proceeds by means of the suitable adhesive agent which bonds the longitudinal edges of the cable sleeve in a sealing manner to one another. Therefore various possibilities will occur which will be explained in the various embodiments. The sealing region along the dividing line of the cable sleeve can also be undertaken with a help of the sealing strip which covers the slot in a sealing manner. A similar arrangement can be obtained when an extension of one of the longitudinal edges of the cable sleeve extends in overlapping relationship with the other edge and has a surface provided with a sealing or adhesive compound.

The reinforcing elements may be applied on a surface of the strip forming this cable sleeve or may be embedded therein. In one embodiment, the embedded portion has proportions that extend therefrom and it is possible that the actual connecting elements are formed in the extended portion of the reinforcing element. If the reinforcing member is being applied on a surface of the cable sleeve, the surface can be provided with a depression for receiving the reinforcing element so that there is no extension or stepped configuration. It is also possible to cover the reinforcing element by a strip or band of sealing material.

BRIEF DESCRIPTION OF THE DRAWINGS

FIG. 1 is a perspective view of a cable sleeve in accordance with the present invention;

FIG. 2 is a partial perspective view with a cross-section of the edge portions of the cable sleeve of the present invention with portions in elevation for purposes of illustration;

FIG. 3 is a partial end view of one edge of an embodiment of a cable sleeve in accordance with the present invention without the reinforcing element;

DESCRIPTION OF THE PREFERRED EMBODIMENTS

Figure 4:
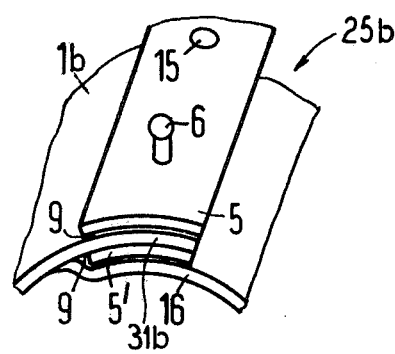
FIG. 4 is a partial perspective view of an end of one edge of an embodiment of the cable sleeve of the present invention.

The principles of the present invention are particularly useful in a cable sleeve generally indication in 25 in FIG. 1. The cable sleeve 25 comprises a strip 1 of thermo-plastic material which has a shape memory imparted thereto so that after the cable sleeve has been applied onto an object, a heat shrinking can occur by heating the sleeve so that the cable sleeve 25 will return to its previous shape with a reduced diameter. Thus, it is possible that the cable sleeve 25 can be shrunk onto the sheaths of a cable on which it has been wrapped around. The cable sleeve 25, as illustrated, is longitudinally divided with longitudinal edges 30 and 31 so that it can be used for uncut cables. During the shrinking process, however, the longitudinal edges 30 and 31 of the cable sleeve 25 which have been brought together are very greatly stressed by means of the shrinking forces which arise and because of this the closure along the dividing line must be embodied with a high mechanical stability. In the known prior art devices, the longitudinal edges were provided with beads which were either held together by a clamping member or clamped together by a clamp. However, these closures display the disadvantages which have already been mentioned. In the case of the present invention, along the longitudinal edges 30 and 31 at least one reinforcement member has been applied to the cable sleeve 1 which to a large extent will prevent deformation of the edges during the shrinking process so that the problems mentioned hereinbefore will no longer occur. The longitudinal edges 30 and 31 are arranged in overlapping relationship in the region of the reinforcement element 2 which in the illustrated embodiment of FIG. 1 includes part of a closing means which has snap elements 3 which connect the two edges 30 and 31 together. As illustrated, the longitudinal edge 31 decreases in thickness so that it has a tapering thickness which terminates in a feather like edge 4 which will engage the inner surface of the other longitudinal edge 30 without any gradation or steps taking place and will overlap the division or slot between the two edges 30 and 31. As illustrated, the slot between edges 30 and 31 extend substantially along a tangent of the surface of the sleeve 25.

An embodiment of the cable sleeve of FIG. 1 is illustrated in FIG. 2 and is generally indicated at 25a. The cable sleeve 25a has coacting connecting or catch elements which lie opposite one another and are arranged on the pair of overlapping edges 30 and 31 of the strip 1. As illustrated, the overlapping edge 31 has coacting connecting elements formed by pins 6 which have an enlarged or thickened end forming a head and extend radially outward from a reinforcing element 5 which is secured on the overlapping edge 31. The pins 6 are illustrated as being separate elements extending through apertures in the reinforcing element 5; however, they could be integrally formed on the element 5. The other edge 30 of the strip 1 has apertures or holes 7 which are extending through an outer reinforcing element 8 and also an inner-reinforcing element 8'. The holes or apertures 7 receive the pins 6 and coact therewith to form the closure means. As illustrated, the pins and the holes are tailored to one another so that they will lock each other together when the pin is inserted in the hole and thus in a simple manner can no longer become loose from one another.

The outer longitudinal edge 30 as mentioned hereinabove is also provided with a second reinforcement element 8' which increases the stability of the edge during the shrinking process. Thus the edge 30 extends between the two reinforcement elements 8 and 8'. When a closure is formed, the longitudinal edge 30 with its pair of reinforcement elements 8 and 8' overlapps the longitudinal edge 31 with the pins 6 being projected through the aperture 7 to form a coacting connecting element of the closure means. The other edge 31 has an extension beyond the element 5, which extension has the tapering cross-section to provide the feathered edge 4 as mentioned with regard to the embodiment of FIG. 1. The edge 30 on an inner surface of the element 8' and the strip 1 is provided with a coating of a meltable adhesive 9 which will melt during the shrinking process and will provide the required seal. The reinforcement members 5, 8 and 8' can be fastened in various manners on the longitudinal edges 31 and 30 respectively of the sleeve or strip member 1. For example by means of heat resistant gluing, by riveting, by sewing or by similar methods.

In the case of the reinforcement according to the present invention it can be assumed that the adhesive and the reinforcements themselves are more heat resistant than the shrinking material of the sleeve member 1 because if they were not, deformations and separations would occur at the edges of the cable sleeve during the shrinking process. In the case of the previous solution, the closure of this sort was not possible since during the shrinking process, the shrinking material became so soft that the mutual hooking would be released or respectively opened up due to expansion. The solution of the closure system and the nature of the invention is thereby not limited only to the linkage shown but also applies to other types of mutual connecting element as for example those illustrated in FIG. 8 and which will be discussed hereinafter.

The mechanical stability or strength between the reinforcing elements according to the presention invention and the shrinkable material of the sleeve member 1 is to be seen as sufficient when the mechanical bond between the two materials is preserved during the required heating of the shrinkable material and that the mechanical bond will withstand the shrinking forces which occur during the time period of the shrinking process. It is also possible to increase the adaptability of the closure system by providing indentations, notches or interruptions in the reinforcing elements or members. Certain tolerance equalizations such as rather large differences in the diameter or even a closure applied along a curve can be best mastered in this manner.

An embodiment of the sleeve member for the cable sleeve is illustrated in FIG. 3 by the strip or sleeve member 1a and deals with a modification of the edge 31a which has the tapering extension or feather edge 4. As illustrated in the drawing, the edge 31a has a longitudinally extending groove or depression 10, which is formed in the material of the sleeve member 1a. Thus, a reinforcing element similar to the element or member 5 can be received in the groove 10 with the upper surface of the element being substantially flush with the outer surface of the sleeve member 1a on the edge 31a. Thus when the closing of the cable sleeve is accomplished by overlapping the longitudinal edges, the closure has the advantage that the gradation or step no longer occurs and requires any compensation.

In another embodiment of the cable sleeve is illustrated by a cable sleeve 25b in FIG. 4 and has a sleeve member 1b. In this embodiment, the sleeve member 1b has an edge 31b which is flush with an edge of the reinforcing element 5. An extension of the edge 31b is formed by the attachment of a sealing strip 16 to an inner surface to the sleeve member 1b inward of the edge 31b. The sealing strip 16 will consist of, for example a thin polyethylene strip coated with a heat meltable adhesive which will cover insertion location for the pins 6 which have the thickened heads or ends and will guarantee a tight seal between the overlapping edges of the cable sleeve 25b. The longitudinal edge 31b of the sleeve member 1b is illustrated as being covered on both surfaces by reinforcement members 5 and 5' which are fastened on the sleeve member 1b by a meltable adhesive 9 which does not react at the temperatures for the shrinking operation. The outside reinforcement elements 5 besides having the pins 6 is also provided with bore holes 15 which will receive corresponding pins that are formed on the other edge which is overlapped onto this edge 31b and will be the outer edge such as illustrated by the edge 30 in FIG. 1. This structure will occur during the manufacturing process so that the closure means, which is formed by this particular structure, will be considered as a component of the cable sleeve 25b.

Figure 5:
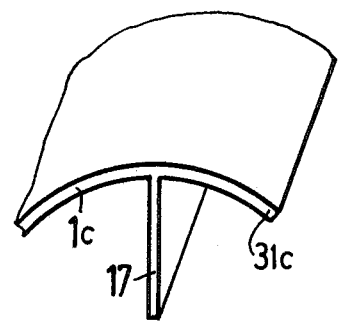
FIG. 5 is a partial perspective view of one end of an edge of a portion of an embodiment of a cable sleeve in accordance with the present invention without the reinforcing member.
Figure 6:
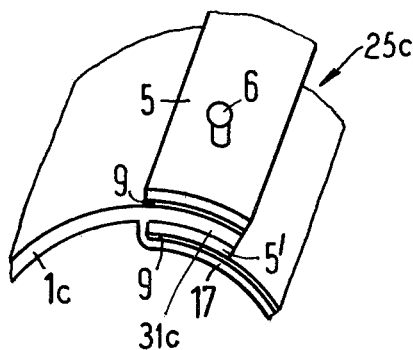
FIG. 6 is a partial perspective view of one end of an edge portion of the cable sleeve illustrated in FIG. 5 with the reinforcing elements.

In a still further embodiment of the present invention which is illustrated in FIGS. 5 and 6, a cable sleeve 25c has a sleeve member 1c with an integral sealing cover 17 which runs parallel to longitudinal edge such as 31c. The integral sealing cover 17 is illustrated in FIG. 5 as an extension which is spaced inwardly from the end surface of the edge 31c. This arrangement simplifies the structure of the closure means and guarantees an easy assembly of the same. The sleeve member 1c of FIG. 5 on its edge 31c is provided with both an outer and the inner reinforcing elements 5 and 5' which are secured thereto by a suitable meltable adhesive 9. As in the embodiment of FIG. 6, the reinforcement 5 has a pin 6. After applying the inner reinforcement element 5', the extension 17, which is shaped or formed integral with the sleeve member 1c is bent to the position illustrated in FIG. 6 so that it extends past the end surface of the edge 31c. In this position, the extension 17 will also act as a cover for overlapping the slot between the two edges of the cable sleeve. Preferably, the extension 17 was coated on its outside edge with an adhesive or bonding agent 9 so that it would be bonded to the reinforcement element 5' and will also be bonded to the internal surface of the other overlapping longitudinal edge which will be the outer of the two edges of the cable sleeve. The hooking together with the reinforcing elements along the longitudinal edges will support the shrinkage forces during the shrinking process. The melting of the layer such as the adhesive coating 9 on the elements 17 in the region of the longitudinal slot between the two overlapping edges will seal the overlapping edges together after cooling of the cable sleeve 1.

Figure 7:
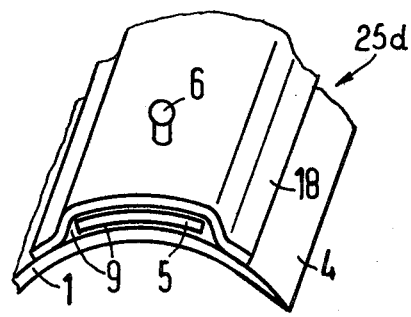
FIG. 7 is a partial perspective view of one end of an edge of another embodiment of a cable sleeve in accordance with the present invention.

In another embodiment of the cable sleeve is illustrated at 25d in FIG. 7, wherein the sleeve member 1 on an edge 31 has a reinforcement element 5 secured by an adhesive 9 to extend along the longitudinal edge which is illustrated has a tapering configuration to form a feather edge 4. To provide the sealing which is required between the reinforcement element and the other edge particularly adjacent the insertion of the pin 6, a sealing strip 18 is applied on the outside of the member 1 to cover the reinforcing element 5 with only the pins 6 protruding thereabove. The sealing strip 18 is also secured onto the sleeve member 1 and the reinforcement 5 by a meltable adhesive 9. The sealing sleeve 18 consists preferably of a cross-linked material so that the required heat resistance is provided. As mentioned hereinabove, the longitudinal edge 31 has the feather edge configuration 4 to provide a good molding of the inner edge to the inner surface or obtaining of a merging of the two overlapped edges without the longitudinal step. This embodiment is utilized in the same manner as the previously described embodiments.

Figure 8:
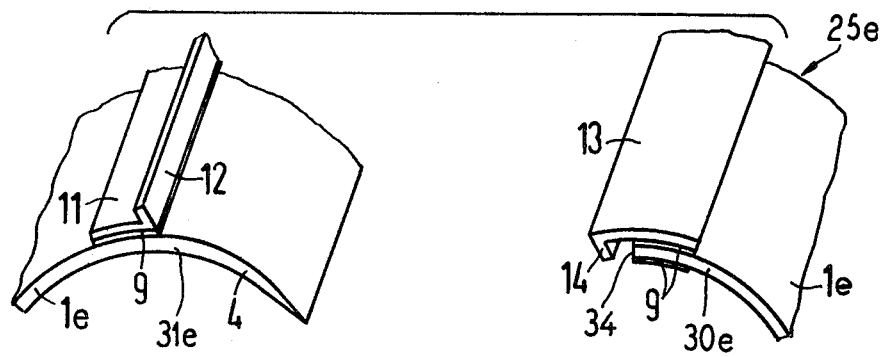
FIG. 8 is a partial perspective view adjacent one end of two edge portions of another embodiment of the sealing system for the cable sleeve of the present invention.

In yet another embodiment of the invention, a cable sleeve is generally indicated at 25e in FIG. 8. The cable sleeve 25e has a sleeve member or strip member 1e with edges 30e and 31e. In this embodiment, the means for closing is formed by continuous hooks and catch elements which are secured to the edges 30e and 31e. Since the longitudinal edges of the sleeve member 1e are fastened over the entire length to distribute the shrinking forces continuously over the entire length, this embodiment now guarantees a still better security during the shrinking process. As illustrated the means for closing includes a reinforcing element 11 having a continuous hook 12 and a reinforcement element 13 having a continuous hook 14. As illustrated, the reinforcing element 11 is secured by an adhesive 9 on an outer surface of the edge portion 31e at a point spaced inwardly from the feathered edge 4 with the hook portion 12 extending radially outwardly. The reinforcing member 13 is attached by an adhesive 9 on the other edge 30e with the continuous hook 14 being spaced from the end surface 34 and pointing radially inward. Adhesive is also applied on an inner surface of the edge 30e adjacent the end surface 34. The closure between the edges 30e and 31e is accomplished by the hook 14 engaging the hook 12 and the inner layer of adhesive coating on the edge 30e being in contact with the outer surface of the edge 31e. Thus, during the heat shrinking operation, this layer will be melted and secure the two edges 30e and 31e together to guarantee the tightness of the entire seal between the two edges of the cable sleeve 25e.

Figure 9:
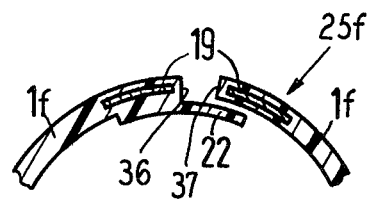
FIG. 9 is a partial cross-sectional view of an embodiment of the cable sleeve with embedded reinforcing elements adjacent the edges in accordance with the present invention.

In each of the previous embodiments, the reinforcing material or element was applied on either an outer or inner surface of the sleeve member adjacent the edge. Another advantageous embodiment of a cable sleeve is illustrated in FIG. 9 and indicated at 25f. The cable sleeve 25f has a reinforcing element 19 embedded or incorporated in the material forming a sleeve member 1f. As illustrated, the element 19 is adjacent each longitudinal edge 36 and 37 of the sleeve member 1f. Also, in this arrangement, it is guaranteed that in case of the softening of the material during the shrinking process, the longitudinal edges 36 and 37 will remain fastened along the dividing lines. The reinforcements 19 can consist of a lattice mesh element or also a tear proof foil strip into which the closure elements are inserted in a manner described with regard to the reinforcing elements such as 5 and 5' in the previous embodiments. It is also desirable that a longitudinal edge such as 36 be provided with an extension 22 which extends from the end surface of edge 36 and will overlap the gap between the two edges 36 and 37 after the closure has been accomplished. To ensure sealing of the two elements, an adhesive coating may be applied on the extension 22.

In another embodiment with embedded reinforcements is shown by the cable sleeve 25g wherein reinforcing elements 20 are embedded in each of the longitudinal edges 36 and 37 of a sleeve member 1g. However, unlike the embodiment of FIG. 9, the reinforcing elements 20 have a longitudinal extending portion 21 which extends from the edges 36 and 37 of the sleeve member 1g and is free of the material of the sleeve member. The free portions 21 of each of the reinforcing elements 20 are suited for the provision of closure elements which can be positioned to avoid catching the material of the sleeve member 1g. The transfer of force from the shrinking material takes place exclusively through the reinforcing elements 20. Thus it is desirable that the reinforcing elements 20 have a lattice or mesh type profile to enable a particular close bond between each reinforcing element and the material of the sleeve member 1g. It is noted that one of the edges such as the edge 36 is provided with an extension 22 that extends past and will engage the other edges 37 adjacent the end surface. As in the previous embodiments, the extension 22 can be covered with an adhesive coating which will guarantee a seal between the two edges when the closure is completed.

Figure 10:
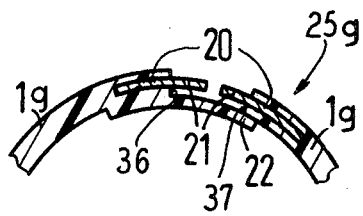
FIG. 10 is a partial cross-sectional view of another embodiment of the cable sleeve with partially embedded reinforcing elements in accordance with the present invention.
Figure 11:
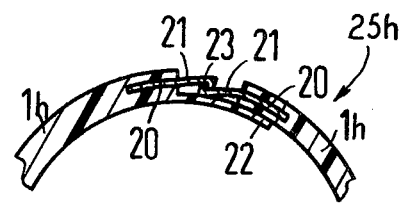
FIG. 11 is a partial cross-sectional view of yet another embodiment of the cable sleeve with partially embedded reinforcing elements in accordance with the present invention.

Another embodiment is illustrated in FIG. 11, wherein a cable sleeve 25h has partially embedded metal reinforcement elements 20, 20 adjacent each edge 36 and 37 which have a portion 21 extending from the end surfaces of the edge 36 and 37 of the sleeve member 1h. However, unlike the embodiment of FIG. 10, the ends of the free portions 21 are formed into closure elements such as hooks 23 for engaging with each to form or complete the means for closing. As in the previous embodiment, the reinforcement element 20 may have a lattice or mesh structure to ensure a good strong connection with the respective edge of the sleeve member 1h. The sleeve member 1h also has an extension 22 which extends past the end surface 36 and is preferably provided with an adhesive for engaging an inner surface adjacent the other edge 37 to form a tight seal to complete the closure of the slot between the two edges.

Although various minor modifications may be suggested by those versed in the art, it should be understood that I wish to embody within the scope of the patent granted hereon, all such modifications as reasonably and properly come within the scope of my contribution to the art.

I claim:

1. In a longitudinally divided cable sleeve having a strip-like sleeve member composed of a thermoplastic synthetic member having a shape memory, said sleeve member having longitudinal edges and closure means for closing said edges together so that the edges can be sealed together after the cable sleeve has been wrapped around an object and the sleeve is shrinkable onto the enclosed object when heat is applied, the improvements comprising the closure means having means for overlapping a slot between the two edges and a mechanical reinforcement for the edges, said reinforcement including a reinforcing element secured to the cable sleeve adjacent each longitudinal edge with at least a portion of said edges overlapping, each of the edges with the reinforcing element being more thermally stable than the remainder of the sleeve member when subjected to the heat for shrinking the sleeve onto an object, said closure means having coacting closure elements comprising headed pins having heads adjacent one end being provided on one reinforcing element and apertures for receiving said headed pins being provided in the other reinforcing element, said apertures and headed pins being constructed to form a mutual locking of the two reinforcing elements and overlapping edges together when the pins are inserted into said apertures to hold the overlapping edges together.

2. In a longitudinally divided cable sleeve according to claim 1, wherein at least one reinforcing element is at least partially embedded into the material of the cable sleeve adjacent each longitudinal edge.

3. In a longitudinally divided cable sleeve according to to claim 2 wherein each of the reinforcing elements comprises a lattice mesh element.

4. In a longitudinally divided cable sleeve according to claim 2, wherein each of the reinforcing elements is formed of a tear resistant foil strip.

5. In a longitudinally divided cable sleeve according to claim 2 wherein the means for overlapping is formed by one of the longitudinal edges of the cable sleeve having a longitudinal extension for covering the gap between the two edges when the edges are held together by the closure elements.

6. In a longitudinally divided cable sleeve according to claim 5, wherein the longitudinal extension tapers to a feather edge at its free end.

7. In a longitudinally divided cable sleeve according to claim 2, wherein at least one of the reinforcing elements is completely embedded in the material of the cable sleeve adjacent the edge.

8. In a longitudinally divided cable sleeve according to claim 1, wherein the reinforcing elements are secured to the longitudinally cable sleeve by a heat resistant adhesive.

9. In a longitudinally divided cable sleeve according to claim 1, wherein the reinforcing elements are attached along the longitudinal edges by rivets.

10. In a longitudinally divided cable sleeve according to claim 1, wherein the reinforcing elements are sewn to the cable sleeve with tear proof threads.

11. In a longitudinally divided cable sleeve according to claim 1, wherein the reinforcing elements are arranged on both sides of at least one longitudinal edge of the cable sleeve.

12. In a longitudinally divided cable sleeve according to claim 1, wherein the reinforcing element of one longitudinal edge is spaced inwardly from said longitudinal edge to form an extension which acts as said means for overlapping the slot, said extension being provided with a coating of a fusable adhesive.

13. In a longitudinally divided cable sleeve according to claim 12, wherein the extension tapers to a feather edge so that it molds into the internal surface of the cable sleeve adjacent said other edge.

14. In a longitudinally divided cable sleeve according to claim 1, wherein each of the reinforcing elements are arranged at the end surfaces of each of the longitudinal edges and which include an integral longitudinally extending extension extending from a line spaced inward from an end surface of the edge, said extension being long enough to extend past said end surface and forming said means for overlapping the slot.

15. In a longitudinally divided cable sleeve according to claim 14, wherein said one edge having the integral extension has a reinforcing element on each surface of said edge, said integral extension covering the intermost reinforcing element and being secured thereto by an adhesive coating.

16. In a longitudinally divided cable sleeve according to claim 1, wherein each of the reinforcing elements are secured to the surface of the cable sleeve adjacent the end surface of each edge, and one of said edges including a sealing strip secured to an inner surface of the cable sleeve along a line spaced inward from the end surface of said edge, said sealing sleeve having a width so that when the edges are held together by the closure means, said sealing strip acts as said means for overlapping the slot.

17. In a longitudinally divided cable sleeve according to claim 16, wherein said one edge has a reinforcing element on each surface and said sealing strip covers the reinforcing element on the inner surface.

18. In a longitudinally divided cable sleeve according to claim 1, wherein one of the edges has a reinforcing element spaced from an end surface thereof, said sleeve includes a sealing strip covering said reinforcing element and acting to close the separation slot between the pair of edges when held together by the closure means.

19. In a longitudinally divided cable sleeve according to claim 1, wherein at least one of the edges has a groove-shaped indentation on a surface of the cable sleeve spaced inward from an end surface of said one edge and the reinforcing element associated with said one edge being disposed in said indentation with the upper surface being flush with the rest of the surface of said cable sleeve.

20. In a longitudinally divided cable sleeve according to claim 19, wherein the portion of the one edge between said indentation and the end surface is said means for overlapping the slot and is tapered into a feathered edge to facilitate merging with the surface of the cable sleeve adjacent the other edge.

21. A longitudinally divided cable sleeve comprising a strip-like sleeve member composed of a thermoplastic synthetic member having a shape memory, said sleeve member having longitudinal edges and closure means for closing said edges together in an overlapping sealed relationship, the closure means having a separate reinforcing element secured to the cable sleeve adjacent each longitudinal edge, the edges with the reinforcing elements being more thermally stable than the remainder of the sleeve when subjected to the heating for shrinking the sleeve onto an object, said closure means having headed pins having heads adjacent one end extending from the element secured to one edge of the sleeve member and apertures for receiving said headed pins being provided in the other edge and a reinforcing element secured thereto, said aperture and headed pins being constructed to form a mutual locking of the two elements together when the pins are inserted into the apertures to hold the edges in an overlapping relationship and sealed together during heat shrinking of the sleeve onto the enclosed object.

22. A longitudinally divided cable sleeve according to claim 21, wherein the one longitudinal edge has means forming an extension for engaging an inner surface of the sleeve member along a line spaced from the reinforcing elements.

23. A longitudinally divided cable sleeve according to claim 22, wherein said extension is provided with a coating of fusible adhesive for sealing the joint during the heat shrinking process.

* * * * *